May 2, 1961 W. G. STOECKICHT 2,982,146
GEAR-MECHANISM WITH A DOUBLE HELICAL GEARING
Filed Jan. 28, 1959
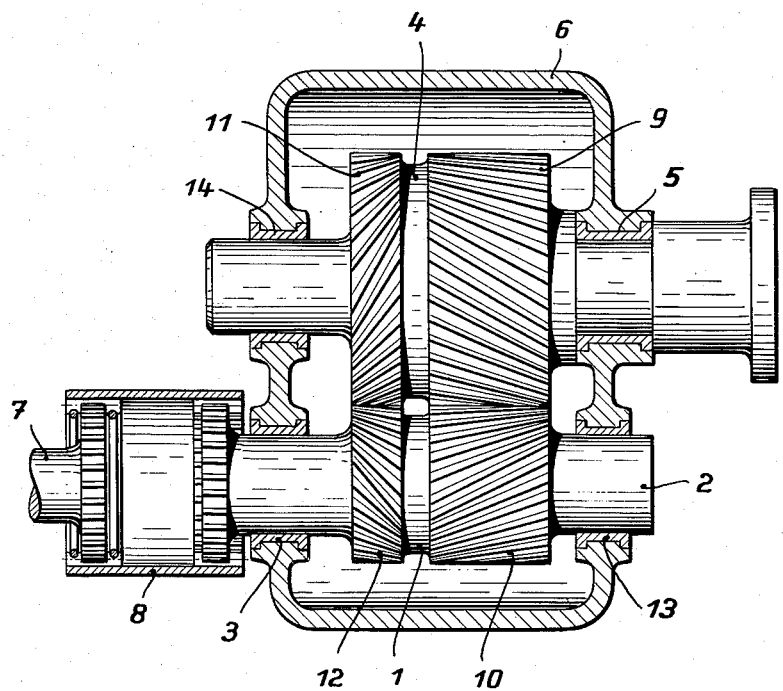
INVENTOR.
WILHELM G. STOECKICHT
BY
Harness, Dickey & Pierce
ATTORNEYS.

United States Patent Office 2,982,146
Patented May 2, 1961

2,982,146

GEAR-MECHANISM WITH A DOUBLE HELICAL GEARING

Wilhelm G. Stoeckicht, 4 Rugendasstrasse, Munich-Solln, Germany

Filed Jan. 28, 1959, Ser. No. 789,581

Claims priority, application Germany Jan. 30, 1958

5 Claims. (Cl. 74—466)

The invention relates to gear mechanisms with double helical gearing.

Gear mechanisms with double helical gears (also referred to as herringbone gears) are now used almost exclusively for the transmission of high loads, particularly at high rotational speeds. The reason for their superiority is that they permit the use of great helical angles without developing unopposed axial forces to be taken up by bearings. The known constructions of such herringbone or double helical gears include two helices of equal size, provided with the same inclination angle but with different pitch directions. Considering such a pair of double helical gears, one of them, usually the larger of the two, is axially fixed and the other is axially adjustable; thus, the latter adjusts itself axially so that the axial, mutually opposed gear forces of the two gear halves can reach equilibrium. A uniform load distribution on the two halves is thus produced, and also, no free axial forces, to be taken up by a bearing, occur.

These advantages have led to an almost universal use of such gear wheels in gear installations for the transmission of high power. Disadvantages have also become apparent, however, arising from the effects of the unavoidable errors in the gearing, which effects are consequently themselves unavoidable. The seriousness of these effects is increased in that they never, or at most only occasionally and by chance, occur in the same way and at the same time on the gears in engagement in the two halves. In the following, plus and minus errors are referred to. A plus error is to be understood to mean an error in action which increases the theoretical amount of pitch; a minus error is consequently an error in action which decreases the theoretical amount of pitch. Such errors in action will be met as a result of adjacent pitch inaccuracy, tooth profile errors, eccentricities and helical angle errors. If, for example, a plus error occurs in the tooth engagement of one of the helices, and a minus error occurs in the tooth engagement in the other helix, the result is that the whole (or substantially the whole) peripheral force acts on the first mentioned helix until the axial tooth force component occurring because of the inclination of the teeth will have shifted the movable gearwheel in such an amount that tooth engagement in the other helix, which has the minus error, will be obtained.

The length of the shifting movement is given on the one hand by the sum of the errors in action to be compensated for and on the other hand by the helical angle of the gearing, the axial shifting being the smaller the larger the inclination angle.

The size of the additional peripheral force acting during the compensating step on the gear half subject to the plus error amounts to at least 100%; for it must take up that part of the load which normally, i.e. under ideal conditions, acts upon the other half. It can be even larger, however, if the axial gear forces set up are not sufficient to shift the pinion wheel with its shaft in the time available in order to compensate for the minus error in the other half and to get this into engagement. This is generally the case in gear mechanisms with high engagement frequencies, particularly if a large gear mechanism with large pinion masses is concerned.

As can be seen, at least in rapidly running gear mechanisms, the advantages of the double helical gearing are obtained at the cost of disadvantages.

The invention has as an object the avoidance of these disadvantages, even if not completely, or at least substantially of reducing them. Other objects will become apparent from a study of the subsequent description and claims.

According to the invention, these objects are affected in that the two helices of a double helical gear mechanism have different inclination angles, whereby the one helix which mainly effects the power transmission has an inclination angle less than 45° of the usual size used in double helical gear mechanisms, for example 30°, and the other has a substantially larger inclination angle, being more than 45°.

The invention itself and its mode of operation are described below in conjunction with the accompanying drawing:

In the figure, a double helical gear mechanism is illustrated, consisting of two interengaging double helical gears, which is constructed according to the invention. The figure represents diagrammatically an axial section through this gear mechanism. The one gear 1 with its shaft 2 is mounted for axial movement in two bearings 3 and 13 and is in engagement with the gear 4, which is itself mounted in the usual way in two bearings 5 and 14, the bearing 5 being constructed in known manner as a thrust bearing acting in both directions. The gear mechanism is enclosed by a housing 6 in the embodiment illustrated; the shaft 2 of the longitudinally movable gear 1 is connected with the part 7 taking up its load (in the embodiment shown, this part 7 is a shaft) by means of a known coupling 8 permitting axial movement, for example a double toothed coupling.

The mode of operation of the invention is best explained by means of a numerical example: it is assumed that the inclination angle of the gearing in the gear sections 9, 10 is of the usual size, 30° for instance. The other gear sections 11, 12 should have a substantially larger helical angle, 60° for example.

If the peripheral forces in the two gearings are indicated with $U_1$ and $U_2$, the helical angles with $\beta_1$ and $\beta_2$ and the axial forces set up on the engaging tooth surfaces as a result of the helical tooth angles with $A_1$ and $A_2$, then following relationships hold:

$$A_1 = U_1 \cdot \tan \beta_1 \text{ and } A_2 = U_2 \cdot \tan \beta_2$$

Because of the equilibrium of the axial forces at the shiftable gear 1, $A_1 = A_2$. Consequently, $U_1 \cdot \tan \beta_1 = U_2 \cdot \tan \beta_2$ or $U_1/U_2 = \tan \beta_2 / \tan \beta_1$ and for the above-mentioned angles ($\beta_1 = 30°$, $\beta_2 = 60°$)

$$\tan \beta_1 = 0.5775$$

and $$\tan \beta_2 = 1.732$$

so that $$U_1/U_2 = 1.732/0.5775 = 3$$
$$U_1 = 3 \cdot U_2$$

In other words, the gear section provided with the inclination angle of 30° takes up 75% of the peripheral load and the other takes up 25%. This means that the dynamic additional loading in the case which the above-mentioned error in action leads to causes substantially the total loading to be transmitted by the 30° gearing, so that in this case the additional loading no longer amounts to 100%, but is only 33⅓% of the nominal loading. This means that the 30° gearing needs only slight increase in width, if any, in order to take up the larger part (75%) of the total loading as a static load.

Obviously, the tooth widths of the two gear sections should be in proportion, or approximately in proportion to the amount of circumferential load to be carried by each of the two gear sections. Thus, the width of the gear section provided with the inclination angle of 30° would be three times as large (or approximately so) as the width of the gear section provided with the inclination angle of 60°.

If, however, the opposite error in action occurs, namely a minus error at the 30° side and a plus error at the 60° side, then this error can never have any practical effect; the very larger axial forces then acting on the 60° side are not only effective to re-establish the quilibrium position at the longitudinal movable gear wheel, but the elastic deformations occurring at the gear flanks of the 60° gearing, because of the larger inclination angle, lead to a still greater yielding in the peripheral direction, so that a dynamic additional loading of the 60° gearing can only occur to a very slight extent.

Constructionally, this arrangement operates so that the 30° gearing, although it must take up a larger part of the load than the gear sections in previously known double helical gear mechanisms, need not or need only slightly be wider than such gear sections. This can be explained as follows: in the conventional double-helical gear, every gear half has to carry 50% of the nominal gear load, but there must be a margin of safety wide enough to allow for at least an overload in the order of the same amount, as set forth above. In the example of the present invention, in which one gear section is provided with an angle of inclination of 30°, and the other gear section with an inclination angle of 60°, the first of the two will carry 75% of the total nominal load, but the margin of safety needed will amount to only about one third, as shown above. Thus a considerable relative reduction of overall width of the whole gear can be obtained. The other gear section with the larger inclination angle, because of the smaller proportion of the load acting on it, is thus made correspondingly smaller than the gear sections used in conventional gear mechanisms. This leads to a reduction of the total width of the gear mechanism, which is in many cases a deciding factor. The smaller width leads to smaller bearing distances and hence to a greater rigidity of the assembly.

A still further advantage of the construction according to the invention of a double helical gear mechanism may also be mentioned. It is known that in many such gear mechanisms torsional deflections occur at the pinion shafts which are very difficult to counteract. It is a disadvantage that the first gear half, as seen in the direction of the flow of force, is subjected not only to torsion by the part of the torque acting on it, but also to additional torsion by the part of the torque acting on the other gear half. With the gear mechanism according to the invention, the gear section provided with the greater inclination angle is less sensitive to torsion than the other, for two reasons: firstly, its tooth width is very small and secondly the torsional deflection does not act fully as a peripheral quantity, but only in the projection on the normal to the tooth flanks. In case of an inclination angle of 60°, this latter fact alone means that the effect is halved. It is thus recommendable to arrange the gear section which is less sensitive to torsion with the larger inclination angle to be first as seen in the direction of the flow of force.

As already mentioned above, the choice of the size of the inclination angle can be made over wide limits, depending on the particular construction in view. Mention may be made, however, of an advantageous kind of inclination angle arrangement, which is of advantage if, for reasons connected with the stock of tools for example, the same normal circular pitch is used for the gearing of both gear sections. In such cases, it is recommendable to choose the number of teeth of the two gears so that they are divisible by a whole number, for example 2 or 3. This may be explained by an example. It may be first be mentioned that, if the two sections of each gear are given the same number of teeth, the normal circular pitch of the gearing is necessarily much smaller with the section having the larger inclination angle than with the other which has the smaller inclination angle. This results from the following equation:

$$p_n = p_{st} \cdot \cos \beta$$

($p_n$ is the normal circular pitch, $p_{st}$ is the transverse circular pitch, $\beta$ is the inclination angle.) Since the transverse pitch is fixed by the number of teeth and pitch diameter, the normal pitch is determined by the cosine of the inclination angle. In the case of the above-mentioned example, in which one gear section has an inclination angle of 30°, the other has an inclination angle of 60°, and the two sections have equal numbers of teeth, the normal pitch is given according to the equation:

$$p_{n30}/p_{n60} = \cos 30°/\cos 60° = 0.866/0.5$$

which means that the normal pitch of the gearing with the larger inclination angle would be considerably smaller than the other. If however, a number of teeth is chosen which is divisible by 2 and the inclination angles of the gearings are chosen so that their cosines are in the ratio of 1:2, then for the gear section with the greater inclination angle half the number of teeth are chosen with twice the transverse pitch and the same normal pitch as chosen for the other gear section. In the same way, other divisors can be used instead of 2.

In the embodiment illustrated, the inclination angles are 30° and 60°, but these figures are chosen merely by way of example; it is clear that the invention is in no way limited to any definite angle.

The invention is of particular value for great mechanisms which operate with high peripheral velocities. In all gear mechanisms for which the peripheral velocity of the pitch circle has a value of 24–30 ft./sec. or more, the advantages achieved by the invention are particularly great.

What I claim is:

1. In a double helical gear mechanism, a first gear section on each gear having teeth with a first inclination angle of less than 45° in one direction, a second gear section on each gear having teeth with a second inclination angle of more than 45° in the opposite direction, said second inclination angle being substantially greater than said first inclination angle to such an extent that the tangent of said second inclination angle is a multiple of the tangent of said first inclination angle, bearing means for one of said gears including means for preventing axial movement thereof, and bearing means for the other gear permitting axial movement thereof.

2. In a double helical gear mechanism, a first gear section on each gear having teeth with a first inclination angle of less than 45° in one direction, a second gear section on each gear having teeth with a second inclination angle of more than 45° in the opposite direction, said second inclination angle being substantially greater than said first inclination angle to such an extent that the tangent of said second inclination angle is a multiple of said first inclination angle, bearing means for one of said gears including means for preventing axial movement thereof, and bearing means for the other gear permitting axial movement thereof, the number of teeth and the cosines of said inclination angles having the same whole-numbered ratio in such a way that the number of teeth of said first gear section is greater than that of said second gear section.

3. In a double helical gear mechanism, a first gear section on each gear having teeth with a first inclination angle in one direction, a second gear section on each gear having teeth with a second inclination angle in the opposite direction, said inclination angles being different to such an extent that the tangent of sad second inclination angle is about three times greater than the tangent of said first inclination angle, bearing means for one of said gears including means for preventing axial movement thereof, and bearing means for the other gear permitting axial movement thereof.

4. In a double helical gear mechanism, a first gear section on each gear having teeth with a first inclination angle in one direction, a second gear section on each gear having teeth with a second inclination angle of more than 45° in the opposite direction, said second inclination angle being greater than the first inclination angle to such an extent that the tangent of said second inclination angle is about three times greater than the tangent of said first inclination angle, the relative widths of said two gear sections being substantial inversely proportional to the tangents of said inclination angles, bearing means for one of said gears including means for preventing axial movement thereof and bearing means for the other gear permitting axial movement thereof.

5. In a double helical gear mechanism, a first gear section on each gear having teeth with a first inclination angle in one direction, a second gear section on each gear having teeth with a second inclination angle in the opposite direction, said second inclination angle being substantially greater than that first inclination angle to such an extent that the tangent of said second inclination angle is about three times greater than the tangent of said first inclination angle, bearing means for one of said gears including means for preventing axial movement thereof, bearing means for the other gear permitting axial movement thereof, a shaft rotatably supported by one of said bearing means and non-rotatably connected to the smaller one of said gears on the side of that gear section thereof having said second inclination angle, and means connected to said shaft for taking up the external torque thereof.

References Cited in the file of this patent

UNITED STATES PATENTS

| | | |
|---|---|---|
| 1,788,701 | Bethume | Jan. 13, 1931 |
| 1,861,258 | Bethume | May 31, 1932 |
| 1,989,663 | Bethume | Feb. 5, 1935 |
| 2,067,477 | Cooper | Jan. 12, 1937 |
| 2,098,864 | Forster | Nov. 9, 1937 |

FOREIGN PATENTS

| | | |
|---|---|---|
| 364,719 | Great Britain | Jan. 14, 1932 |